3,506,729
METHOD OF MAKING SOLID CYCLOPENTA-DIENYLLITHIUM COMPOUNDS

William Novis Smith, Jr., Exton, and Edward D. Kuehn, West Chester, Pa., assignors to Foote Mineral Company, Exton, Pa., a corporation of Pennsylvania
No Drawing. Filed Nov. 28, 1967, Ser. No. 686,277
Int. Cl. C07j 1/02
U.S. Cl. 260—665
19 Claims

ABSTRACT OF THE DISCLOSURE

In the preparation of cyclopentadienyllithium and methylcyclopentadienyllithium by reacting lithium metal with cyclopentadiene or methylcyclopentadiene in the presence of tetrahydrofuran, there is included in the reaction mixture diethylether or a hydrocarbon containing from 5 to 8 carbon atoms in an amount to precipitate at least a major proportion of the cyclopentadienyllithium compound.

---

The present invention relates to a simple, economical process by which cyclopentadienyllithium and methylcyclopentadienyllithium can be prepared in solid form, free of solvent and in high yield by simple mechanical separation of the compound, as by filtration, from the reaction mixture and subsequent vacuum drying, if desired.

BACKGROUND OF THE INVENTION

Cyclopentadienyllithium has been prepared in tetrahydrofuran (see H. Gilman et al., J. Org. Chem., vol. 23 page 550, 1958), by reaction between lithium metal and cyclopentadiene with the liberation of hydrogen, according to the equation:

$$Li+RH \rightarrow RLi + \tfrac{1}{2}H_2$$

The product is highly soluble in the tetrahydrofuran, so that recovery of the product in solid form has required extensive and costly evaporation of the solvent.

Cyclopentadienyllithium has also been prepared by reacting n-butyllithium with cyclopentadiene in diethyl ether in which the product is insoluble and from which it precipitates (U.S. Patent No. 3,152,157).

It is the principal object of the present invention to provide a simple, economical process, utilizing lithium metal as a reactant, for producing cyclopentadienyllithium and methylcyclopentadienyllithium directly in solid form.

It is another object of the present invention to provide a simple, economical process, utilizing lithium metal as a reactant, for producing cyclopentadienyllithium and methylcyclopentadienyllithium in solid form by simple mechanical separation of the reaction product from the reaction medium.

Other objects will become apparent from a consideration of the following specification and the claims:

SUMMARY OF THE INVENTION

The method of the present invention comprises, in the preparation of a cyclopentadienyllithium compound selected from the group consisting of cyclopentadienyllithium and methylcyclopentadienyllithium by reacting lithium metal with a cyclopentadiene compound selected from the group consisting of cyclopentadiene and methylcyclopentadiene in the presence of tetrahydrofuran, the improvement whereby the cyclopentadienyllithium compound is produced in solid form in high yield which comprises adding to the reaction mixture at least one liquid selected from the group consisting of diethylether and hydrocarbons containing from 5 to 8 carbon atoms in an amount to precipitate at least a major proportion of the cyclopentadienyllithium compound. The precipitated cyclopentadienyllithium compound can be simply removed from the reaction mixture mechanically, as by filtration, centrifuging, and the like, and subsequently dried at elevated temperature under vacuum, if desired, to remove the last traces of solvent.

The present method is based upon the discovery that, although the presence of tetrahydrofuran is required for the reaction between lithium metal and the cyclopentadiene compound, the presence of a not unduly large volume of diethyl ether or one of the stated hydrocarbons, either during the reaction or after the reaction has occurred in the tetrahydrofuran, causes most of the cyclopentadienyllithium product to precipitate.

The present method may take the form of either one of two general embodiments: (1) where the precipitating liquid is present during reaction between the lithium metal and the cyclopentadiene compound in the presence of tetrahydrofuran, and (2) where the precipitating liquid is added after substantial reaction between the lithium metal and the cyclopentadiene compound in tetrahydrofuran has taken place. In either case most of the cyclopentadienyllithium compound produced, and, in the preferred embodiment, substantially all thereof, separates out as a solid which can then, as stated, be simply mechanically separated from the liquid medium.

Regardless of which embodiment is employed, the reaction takes place in the presence of tetrahydrofuran. The amount of lithium metal and cyclopentadiene compound employed will be, with respect to the tetrahydrofuran, at least 0.1 molar. That is to say, the amount of lithium metal and cyclopentadiene compound will be equivalent to the corresponding cyclopentadienyllithium compound in a concentration of at least 0.1 molar with respect to the tetrahydrofuran. Preferably the stated concentration is at least 1 molar. The amounts employed may be well above this, up to several molar and well beyond saturation in the tetrahydrofuran itself. The exact upper limit may depend upon the particular embodiment employed. For example, in embodiment 1 wherein the precipitating liquid is present during the reaction, the maximum amount of lithium metal and cyclopentadiene compound is about 4 molar, preferably about 3 molar, relative to the tetrahydrofuran; and in embodiment 2 the maximum amount of lithium metal and cyclopentadiene compound is about 6 molar since, even though some of the reaction product will precipitate out before addition of the precipitating liquid, substantially the remainder thereof will precipitate out upon the addition of the precipitating liquid. In embodiment 2 the preferred maximum is also about 3 molar.

The reaction stoichiometrically requires one mol of lithium metal and one mol of cyclopentadiene compound. In practice, it is preferred to use some excess of cyclopentadiene compound, generally at least about 10% excess. While up to about 100% excess may be employed, in most cases from about 15 to about 50% excess is preferred.

In embodiment 1, as stated, the precipitating liquid is present substantially at the outset so that the major portion of the reaction between the lithium metal and the cyclopentadiene compound take place in the mixture of tetrahydrofuran and the precipitating liquid. In this case it is preferred to initiate the reaction in the tetrahydrofuran alone by adding a very small proportion, such as from about 2 to about 10% of the cyclopentadiene compound to the lithium, in the tetrahydrofuran. For example, in this embodiment, the required amount of lithium metal may be added first to the tetrahydrofuran, a small amount of the cyclopentadiene compound is added to initiate reaction, the precipitating liquid is then added following which the remainder of the cyclopentadiene compound is added.

In embodiment 1, the solubility of the reaction product in the tetrahydrofuran that is present is sufficient to maintain the surface of the lithium metal clean so that reaction with the cyclopentadiene compound proceeds in spite of the presence of the precipitating liquid. However, as cyclopentadienyllithium compound forms, it precipitates from the medium.

In embodiment 2, as stated, the precipitating liquid is added to the reaction mixture after reaction between the lithium metal and the cyclopentadiene compound has become substantially complete. For example, in this embodiment, lithium metal may be first added to the tetrahydrofuran following which the cyclopentadiene compound is added thereto for reaction. Thereafter, the precipitating liquid is added to the mixture causing the product previously in solution in the tetrahydrofuran to precipitate. Preferably, in this embodiment 2, the amount of lithium metal and cyclopentadiene compound employed, with respect to the tetrahydrofuran, is in excess of the saturation point of the cyclopentadienyllithuim product therein. This provides the most efficient operation since, upon precipitation of the remaining product, optimum amounts of desired solid product can be obtained.

Obviously, there is no sharp line of demarcation between the two embodiments referred to above since, as will be apparent, the precipitating liquid can be incorporated at any time from prior to the main reaction to afterwards. The important feature is the inclusion in the reaction mixture of the precipitating liquid resulting in precipitation of the reaction product. Embodiment 2 is presently preferred.

Referring more particularly to the precipitating liquid, it may be, as stated, at least one of those selected from the group consisting of diethyl ether and hydrocarbons containing from 5 to 8 carbon atoms. The hydrocarbon may be saturated aliphatic, including cycloaliphatic, or it may be aromatic. Examples of such hydrocarbons are pentane, hexane, heptane, octane, cyclopentane, cyclohexane, cycloheptane, benzene, toluene, xylene and the like. Pentane is presently preferred.

The relative proportions of tetrahydrofuran and precipitating liquid may vary somewhat. Generally no more than about 95% by volume, of the precipitating liquid based on the combined volumes of precipitating liquid and tetrahydrofuran, will be employed. In other words, the amount of tetrahydrofuran, relative to the mixture thereof with the precipitating liquid will be at least about 5%, by volume. At low proportions of tetrahydrofuran, such as in the range of from about 5 to about 15%, the maximum proportion of the reaction product precipitates. However, at this level of tetrahydrofuran, the reaction does not proceed as fast as it does at higher levels and some lithium appears to react with the hydrogen by-product to form lithium hydride thereby decreasing the yield of desired product. The reaction proceeds at the most favorable rate at a proportion of tetrahydrofuran of at least about 20%, by volume, and preferably at least about 30%, by volume. At a proportion of tetrahydrofuran of about 60%, about 85% of the desired reaction product precipitates and this further falls off at about 65% tetrahydrofuran. In accordance with preferred practice, the proportion of tetrahydrofuran is between about 20 and about 45%, preferably between about 30 and about 40%, by volume, based upon the mixture of tetrahydrofuran and precipitating liquid.

The reaction can take place at temperatures ranging from as low as about 0° C. up to refluxing. However, because of the danger of dimerization of the cyclopentadiene reactant at elevated temperatures, and since the reaction proceeds smoothly at lower temperatures, it is preferred to operate at or below room temperature, preferably in the neighborhood of about 5 to about 15° C.

It is also advantageous, as is generally the case in reactions involving lithium metal, that the reaction be carried out under an atmosphere substantially devoid of oxygen and water vapor. Hence, in accordance with known practice, an inert atmosphere, such as argon, nitrogen, and the like is employed.

As to the cyclopentadiene compound reactant, advantageously it is freshly prepared, as by cracking dicyclopentadiene.

The lithium metal employed should be finely-divided. While small pieces of lithium, such as cut lithium wire, may be employed, it is preferred to use the well known lithium dispersion. Such dispersions are prepared by rapidly stirring molten lithium metal into an inert liquid such as mineral oil or toluene, so that the metal solidifies as very tiny droplets, generally no more than about 100 microns in size and most usually from about 25 to about 75 microns in size. The finely-divided lithium metal may be filtered from the liquid to provide, after washing and drying, what is known as dry dispersion, or, after simply removing the bulk of the liquid as by filtering or decanting, the lithium may be washed with and re-slurried in another liquid, such as the tetrahydrofuran used in the present method.

Advantageously, a small amount of sodium will be included with the lithium, as by adding sodium to the molten lithium in preparing the above-described dispersion. The amount of sodium so added will generally range from about 0.3 to about 2%, and preferably from about 0.5 to about 1%, by weight, based on the weight of lithium.

The following examples are given for the purpose of illustration only and are not intended to limit the scope of the invention in any way:

Example 1

A 3-neck, 500 ml. reaction flask, under argon atmosphere, is charged with 11.8 g. of dry lithium dispersion containing 1% of sodium and 200 ml. of tetrahydrofuran. Three ml. of freshly prepared cyclopentadiene is added to initiate reaction at 26° C. following which the mixture is cooled to 5° C. and the remainder of the cyclopentadiene (12.9 g. total) is added over a period of 2 hours. The mixture is stirred for 2 hours at 5° C., allowed to warm to room temperature and 467 ml. of pentane is added. The resulting slurry is stirred for 2 hours and then filtered. The solid product is dried at between 40 and 50° C. under vacuum to provide 111 g. of cyclopentadienyllithium in 90% yield and with a purity of 99%.

Example 2

A 3-neck, 500 ml. reaction flask, under argon atmosphere, is charged with 7.3 g. of dry lithium dispersion containing 1% of sodium and 300 ml. of tetrahydrofuran. Ten ml. of freshly prepared methylcyclopentadiene are added to initiate the reaction at 35–40° C. following which the remainder of the methylcyclopentadiene is added over a period of 70 minutes at 35–40° C. The mixture is stirred for a further 3 hours and then 700 ml. of hexane is added. After stirring for another hour the resulting slurry is filtered. The solid product is dried at between 40 and 50° C. under vacuum to provide 69 g. of methylcyclopentadienyllithium with a lithium content of 9.28% by base titration.

Example 3

A 3-neck, 500 ml. reaction flask, under argon atmosphere, is charged with 11.8 g. of dry lithium dispersion containing 1% of sodium and 180 ml. of tetrahydrofuran. Three ml. of freshly prepared cyclopentadiene is added at 25° C. to initiate reaction following which the mixture is cooled to 15° C. and 420 ml. of benzene is added. The remainder of the cyclopentadiene (129 g. total) is added over a period of 2 hours at 15–20° C. After stirring 2 hours longer, the slurry is allowed to warm to room temperature, stirred an additional 2 hours and filtered. The solid product is dried under vacuum at between 40 and 50° C. to give 106 g. of cyclopentadienyllithium in 86% yield and having a purity of 98%.

Example 4

A 3-neck, 500 ml. reaction flask, under argon atmosphere, is charged with 2.3 g. of dry sodium-free lithium dispersion and 150 ml. of tetrahydrofuran. Seven grams of freshly prepared cyclopentadiene is added to initiate reaction at 25° C. and then 100 ml. of diethyl ether is added. The mixture is cooled to 0° C. and the remainder of the cyclopentadiene (28.6 g. total) is added over a period of 30 minutes. The mixture is stirred and allowed to return to room temperature over a period of 10 hours. Filtering the slurry and drying the solid product under vacuum at between 40 and 50° C. gives 22.3 g. of cyclopentadienyllithium in 93% yield and having a purity of 99%.

Modification is possible in the selection of materials and in the procedural techniques employed without departing from the scope of the invention.

What is claimed is:

1. In the preparation of a cyclopentadienyllithium compound selected from the group consisting of cyclopentadienyllithium and methylcyclopentadienyllithium by reacting lithium metal with a cyclopentadiene compound selected from the group consisting of cyclopentadiene and methylcyclopentadiene in the presence of tetrahydrofuran, the amount of lithium metal and cyclopentadiene compound, relative to the tetrahyrofuran, being at least 0.1 molar, the improvement whereby the cyclopentadienyllithium compound is produced in solid form and essentially free of solvent which comprises adding to the reaction mixture at least one liquid selected from the group consisting of diethyl ether and hydrocarbons containing from 5 to 8 carbon atoms, the proportion of tetrahydrofuran to said liquid, in the final mixture, being about 5 to about 65%, by volume, to precipitate at least a major proportion of the cyclopentadienyllithium compound.

2. The method of claim 1 wherein said proportion of tetrahydrofuran is from about 20 to about 45%.

3. The method of claim 2 wherein said proportion of tetrahydrofuran is from about 30 to about 40%.

4. The method of claim 1 wherein said liquid is present along with the tetrahydrofuran during reaction between the lithium and the cyclopentadiene compound.

5. The method of claim 4 wherein the amount of lithium and cyclopentadiene compound, relative to the tetrahydrofuran, is from about 0.1 to about 4 molar, and wherein the proportion of tetrahydrofuran to said liquid is from about 5 to about 65%, by volume.

6. The method of claim 5 wherein the amount of lithium and cyclopentadiene compound, relative to the tetrahydrofuran, is from about 1 to about 3 molar, and wherein said proportion of tetrahydrofuran is from about 20 to about 45%.

7. The method of claim 6 wherein said proportion of tetrahydrofuran is from about 30 to about 40%.

8. The method of claim 4 wherein said liquid is pentane.

9. The method of claim 6 wherein said liquid is pentane.

10. The method of claim 4 wherein said cyclopentadiene compound is cyclopentadiene.

11. The method of claim 6 wherein said cyclopentadiene compound is cyclopentadiene.

12. The method of claim 1 wherein said liquid is added to the reaction mixture after substantial reaction between the lithium and the cyclopentadiene compound.

13. The method of claim 12 wherein the amount of lithium and cyclopentadiene compound, relative to the tetrahydrofuran, is from about 0.1 to about 6 molar.

14. The method of claim 13 wherein the amount of lithium and cyclopentadiene compound, relative to the tetrahydrofuran, is from about 1 to about 3 molar; and wherein said proportion of tetrahydrofuran is from about 20 to about 45%.

15. The method of claim 14 wherein said proportions of tetrahydrofuran is from about 30 to about 40%.

16. The method of claim 12 wherein said liquid is pentane.

17. The method of claim 14 wherein said liquid is pentane.

18. The method of claim 12 wherein said cyclopentadiene compound is cyclopentadiene.

19. The method of claim 14 wherein said cyclopentadiene compound is cyclopentadiene.

References Cited

UNITED STATES PATENTS 3,152,157  10/1964  Shapiro et al. _____ 260—438

OTHER REFERENCES

Gilman et al., J. Org. Chem., 23 (1958) pp. 550–1.

Birmingham, Advances in Organometallic Chemistry vol. 2 (1964), Academic Press, New York, N.Y., pp. 368–9.

Weissberger Technique of Organic Chemistry vol. III (1956), Interscience Publishers Inc., New York, N.Y., p. 475.

TOBIAS E. LEVOW, Primary Examiner

A. P. DEMERS, Assistant Examiner